United States Patent
Kochan (10) Patent No.: US 10,451,155 B2
(45) Date of Patent: Oct. 22, 2019

(54) NON-BACKDRIVABLE SELF-LOCKING GEAR SYSTEM

(71) Applicant: Stephen John Kochan, Skaneateles, NY (US)

(72) Inventor: Stephen John Kochan, Skaneateles, NY (US)

( * ) Notice: Subject to any disclaimer, the term of this patent is extended or adjusted under 35 U.S.C. 154(b) by 123 days.

(21) Appl. No.: 15/430,083

(22) Filed: Feb. 10, 2017

(65) Prior Publication Data

US 2017/0234407 A1    Aug. 17, 2017

Related U.S. Application Data

(60) Provisional application No. 62/294,693, filed on Feb. 12, 2016.

(51) Int. Cl.

| | |
|---|---|
| *F16H 35/00* | (2006.01) |
| *F16H 1/28* | (2006.01) |
| *F16H 1/32* | (2006.01) |
| *B66D 1/24* | (2006.01) |
| *B66D 1/22* | (2006.01) |
| *B66D 1/16* | (2006.01) |

(52) U.S. Cl.
CPC ............. *F16H 35/00* (2013.01); *B66D 1/24* (2013.01); *F16H 2035/005* (2013.01)

(58) Field of Classification Search
CPC ... F16H 35/00; F16H 1/28; F16H 1/32; F16H 2035/005; B66D 1/24; B66D 1/22; B66D 1/16
See application file for complete search history.

(56) References Cited

U.S. PATENT DOCUMENTS

| | | | | |
|---|---|---|---|---|
| 1,532,202 A | * | 4/1925 | Powell | B66D 1/24 188/82.4 |
| 2,759,703 A | * | 8/1956 | Holmes | B64C 1/22 254/283 |
| 2,778,471 A | * | 1/1957 | Kuhn | B66D 1/24 192/138 |
| 3,309,066 A | * | 3/1967 | Carlson | B66D 1/22 242/390.9 |
| 5,123,630 A | * | 6/1992 | Watson | B66D 1/24 254/346 |
| 8,591,367 B2 | * | 11/2013 | Kochan | F16H 1/003 475/149 |
| 9,222,555 B2 | * | 12/2015 | Morin | F16H 19/04 |
| 9,399,566 B2 | * | 7/2016 | Hall | B66D 1/38 |
| 9,810,109 B2 | * | 11/2017 | Pluta | F01L 1/352 |

(Continued)

*Primary Examiner* — Tinh T Dang
(74) *Attorney, Agent, or Firm* — Woods Oviatt Gilman LLP; Katherine H. McGuire, Esq.

(57) ABSTRACT

The present invention is directed to a self-locking non-backdrivable gear system. The gear system may comprise a primary motor input and self-lubricating gear box. The primary motor input is for rotation of the gearbox about the axis of a drive shaft. The gearbox may comprise an input ring gear, one or more planet locking gears, fixed spur gear, and output spur gear. In operation, rotation of the primary motor input causes rotation of the ring gear which causes rotation of the planet locking gear which causes rotation of the output spur gear which causes rotation of the drive shaft. However, in the absence of rotation of the ring gear, a rotational force applied to the output spur gear causes the gear teeth on the fixed and output spur gears to lock the planet gear in place.

11 Claims, 8 Drawing Sheets

(56) References Cited

U.S. PATENT DOCUMENTS

| | | | | |
|---|---|---|---|---|
| 9,975,745 B2* | 5/2018 | Hall | ............. | B66D 5/02 |
| 10,006,321 B2* | 6/2018 | Simpson | ............. | F01L 1/352 |
| 2009/0078528 A1* | 3/2009 | Uzawa | ............. | B60K 7/0007 |
| | | | | 192/12 D |
| 2016/0333964 A1* | 11/2016 | Scekic | ............. | F16H 1/28 |

* cited by examiner

NON-BACKDRIVABLE SELF-LOCKING GEAR SYSTEM

BACKGROUND OF THE INVENTION

The present invention generally relates to the field of gear design, and more particularly relates to gear systems which are self-locking and non-backdrivable, and even more particularly relates to self-lubricating, externally rotatable gearbox systems with gear teeth having noise-dampening pressure angles.

Modern post-industrial society hinges on the ability to move and stop at will. With the emergence of sophisticated control modeling software, a need has arisen for the precise ability to stop and move machinery to known positions safely. Whether it is a robotic arm on the assembly-line floor, a numerically controlled milling machine that mills aluminum into intricate finished products or a 3D printer for creating plastic prototypes, machines must move in a known and repeatable manner. Machinery that moves in close proximity to people must additionally have the ability to move with great safety. The present invention may be implemented into machinery to allow for such mechanical movements.

SUMMARY OF THE INVENTION

With reference to the application of the inventive gear system discussed herein, the system provides a simple and low-cost self-lubricating gearbox that can be driven in a forward and reverse direction through an input motor shaft, but cannot be back-driven through its output gearing. By virtue of its configuration as a ring gear, the invention can be effectively integrated into any rotating machinery which utilizes a winch/drum. As such, these inventive gear systems have particular application in the field of overhead lifting machinery, although the invention is not so limited. For example, winch machinery that utilizes a cable winding onto a cylindrical or pile-up drum must be able to wind in both a clockwise and counterclockwise direction, but not drop the load. These inventive gear systems may also be applied to move scenery, create effects, and manipulate overhead lighting and machinery during theatrical performances.

In the case of machinery that uses chain or screw jack components, a non-back driving, self-locking gearbox would offer benefits superior to existing configurations made up of friction brakes and worm drive gearboxes. The integrated benefits of a planetary type gear train further allow for a compact assembly. The system's hollow through the center output spur shaft can pass wiring through to a rotating connection, as well as the simple insertion of downstream equipment shafts. This would be particularly useful for cable drums winding electrified cable, and turntables with electrics/electronics on board, for example.

The inventive gear system moreover addresses certain drawbacks of similar existing gear systems, e.g., vibration and noise issues that are unacceptable in certain settings (such as during theatrical performances) and burdensome maintenance through the routine lubrication of the system gears.

To address such drawbacks, briefly described, the self-locking, non-backdrivable gear system of the present invention comprises a primary motor input and self-lubricating gear box. The primary motor input is adapted for rotation of the gearbox about the axis of a drive shaft. The gearbox comprises an input ring gear, ring plate and seal configuration, planet locking gear, fixed spur gear, and output spur gear. The input ring gear is mounted around the driveshaft and positioned in meshing engagement with the primary motor input. The ring plate and seal configuration are mounted to the ring gear and seal the components within the ring gear so as to allow the internal self-lubrication of the gearbox through a volume of lubricant.

One or more planet locking gears is rotatably mounted within the ring gear, whereby the planet gear rotates with the ring gear and also rotates about its own mounting axis. The output spur gear is rotatably mounted within the ring gear, in a radially inward, concentric relation to the ring gear, and further includes an output shaft adapted for mounting to the drive shaft. The output spur gear has N+/−X number of gear teeth in meshing engagement with the planet gear. The fixed spur gear is fixedly mounted around the output shaft and positioned adjacent to the output spur gear. The fixed spur gear has N number of gear teeth in meshing engagement with the planet gear teeth. The fixed and output spur gears have substantially similar diameters to allow the fixed and output spur gear teeth to substantially align while engaging with the planet gear. The fixed and output spur gear teeth each comprise a noise-dampening pressure angle configuration to angularly compliment the planet gear teeth.

In operation, rotation of the primary motor input causes rotation of the ring gear which causes rotation of the planet gear which causes rotation of the output spur gear which causes rotation of the drive shaft. However, in the absence of rotation of the ring gear, any rotational force applied to the output spur gear (e.g., via the output shaft) will force the substantially aligned fixed and output gear teeth to lock the planet locking gear in place.

Other aspects of the system are provided herein. For example, in an embodiment of the system having two planet locking gears, the second planet locking gear may be rotatably mounted within the ring gear in a 180° off-set relation with respect to the first planet locking gear, about the full 360° circumference of the ring gear. The first and second planet gears rotate with the ring gear and also rotate about their own respective mounting axes while engaging the fixed and output spur gear teeth. In the absence of rotation of the ring gear, any rotational force applied to the output spur gear will force the fixed and output spur gear teeth to lock the first and second planet gears in place.

The primary motor input may include a sprocket in meshing engagement with a timing belt. The primary motor input may otherwise include a sprocket in meshing engagement with a timing chain. The primary motor input may otherwise include a sprocket in meshing engagement with a plurality of timing gears.

Each seal of the ring plate and seal configuration may be an O-ring or shaft seal. The gearbox may further comprise a ball bearing ring positioned on the output shaft to facilitate rotation of the output spur gear. The pressure angle configuration may be from about 45 degrees to about 25 degrees. The pressure angle configuration may more preferably be from about 40 degrees to 30 degrees. The pressure angle configuration may most preferably be about 35 degrees. The components of the gearbox may be made from metal, plastic, composite, ceramic, wood, plywood, metal powder, or combinations thereof.

Additional objects, advantages and novel features of the present invention will be set forth in part in the description which follows, and will in part become apparent to those in the practice of the invention, when considered with the attached figures.

BRIEF DESCRIPTION OF DRAWINGS

The accompanying drawings form a part of this specification and are to be read in conjunction therewith, wherein.

DETAILED DESCRIPTION OF PREFERRED EMBODIMENTS

Figure 6:
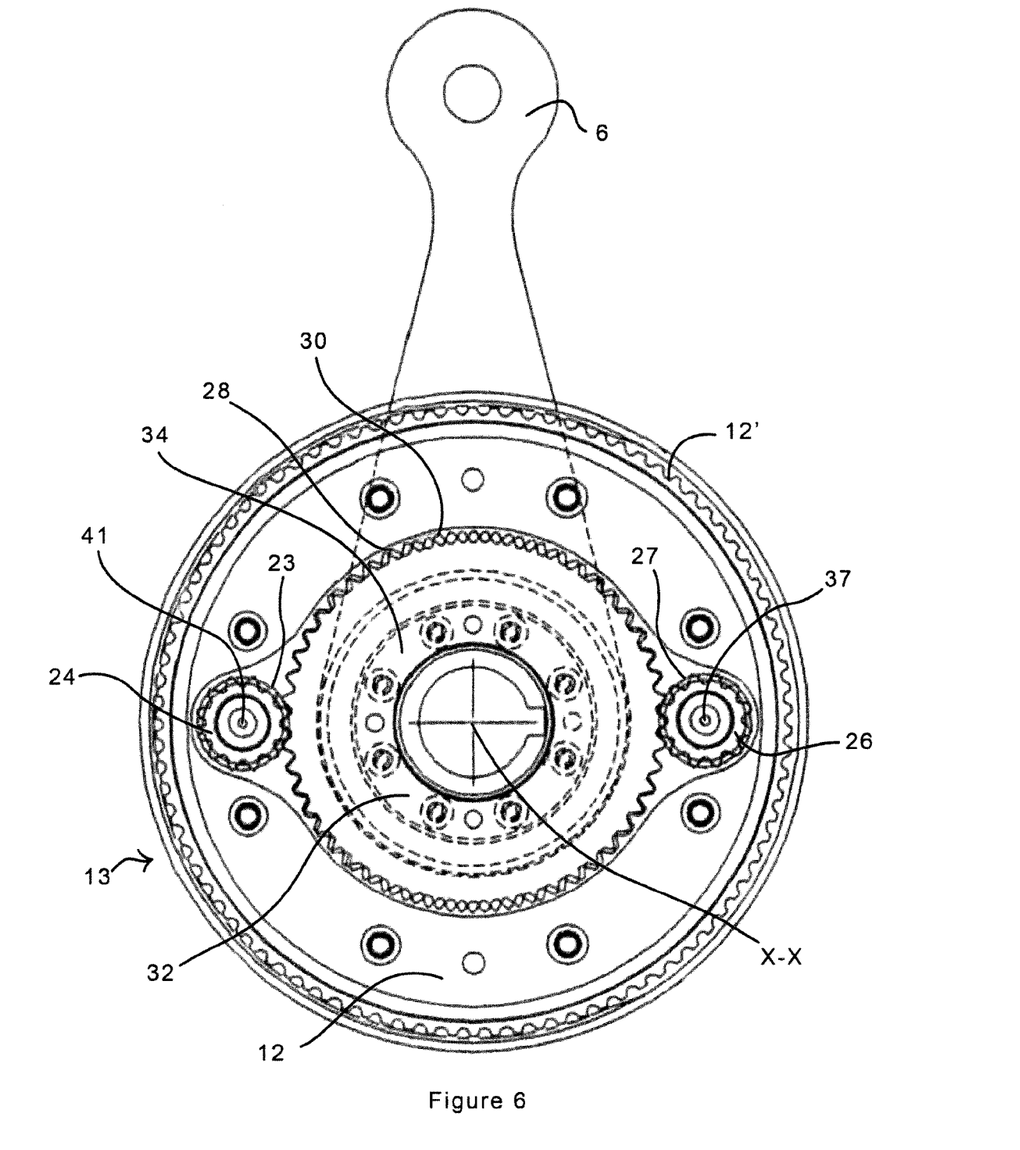
FIG. 6 is a front, cross-sectional, plan view of the gearbox of the present invention, taken across line 6-6 of FIG. 3.

Referring now to the drawings, there is seen in FIGS. 1 through 4 a non-backdrivable self-locking gear system embodiment referred to herein as the "output ring gear system" and indicated generally by the reference numeral 10. This embodiment has a fixed spur gear and output spur gear arrangement in a gearbox 13 configuration and mounted to a back plate 17 via a mount paddle 6 (FIG. 6). Back plate 17 abuts a winch 15 on one side and on the other side may be connected to a gear support plate 14 through a series of bolts 11. Gear support plate 14 supports and substantially protects gearbox 13 from the surrounding environment during operation. Output ring gear system 10 may also be mounted within a cast or fabricated box for safety purposes and/or conventionality.

Motor 16 is mounted to a motor plate 9. Motor 16 rotates a sprocket 18 via shaft 20. Sprocket 18 rotates a timing belt 22 that, in conjunction with the input motor 16, sprocket 18, and shaft 20, makes up the primary motor input of the output ring gear system 10. A plurality of teeth on the underside of timing belt 22 mesh with the teeth 18' of sprocket 18 and the teeth 12' on the external side of an input ring gear 12 of a gearbox 13, which is mounted to a drive shaft 32 of gear system 10. Drive shaft 32 connects to winch 15 on which a cord connected to a load may be wound (not shown).

When shaft 20 rotates sprocket 18, timing belt 22 causes input ring gear 12 to rotate around the longitudinal axis X-X of the drive shaft 32 (FIG. 6) in a synchronous relationship with shaft 20. Rotating input ring gear 12 in this manner may effectively be quieter than rotating input ring gear 12 by other previously-known configurations (e.g., a sun gear connected to input ring gear 12 or any internal components therein) known to generate substantial amounts of mechanical noise. Rotation of input ring gear 12 moreover causes the internal components (discussed below) of gearbox 13 to rotate. In other embodiments of output ring gear system 10, timing belt 22 may be a timing chain or a plurality of timing gears (interposed between sprocket 18 and input ring gear 12). Other gear system 10 embodiments may be configured to comprise a plurality of input ring gears 12, positioned such that each may be driven by a single primary motor input (e.g., timing belt, sprocket, and motor configuration).

It should be appreciated that motor 16 may, for example, be a NEMA (National Electrical Manufacturers' Association) "C-Faced" motor. However, motor 16 may also be replaced with a manual operation device (e.g., crank and lever configurations) for rotation of the sprocket 18 via shaft 20. It should be further understood that the primary motor input may be embodied to comprise other components and configurations (e.g., pinion, annular gear, etc.). Other embodiments of gear system 10 may even further include multiple motor inputs.

Figure 1:
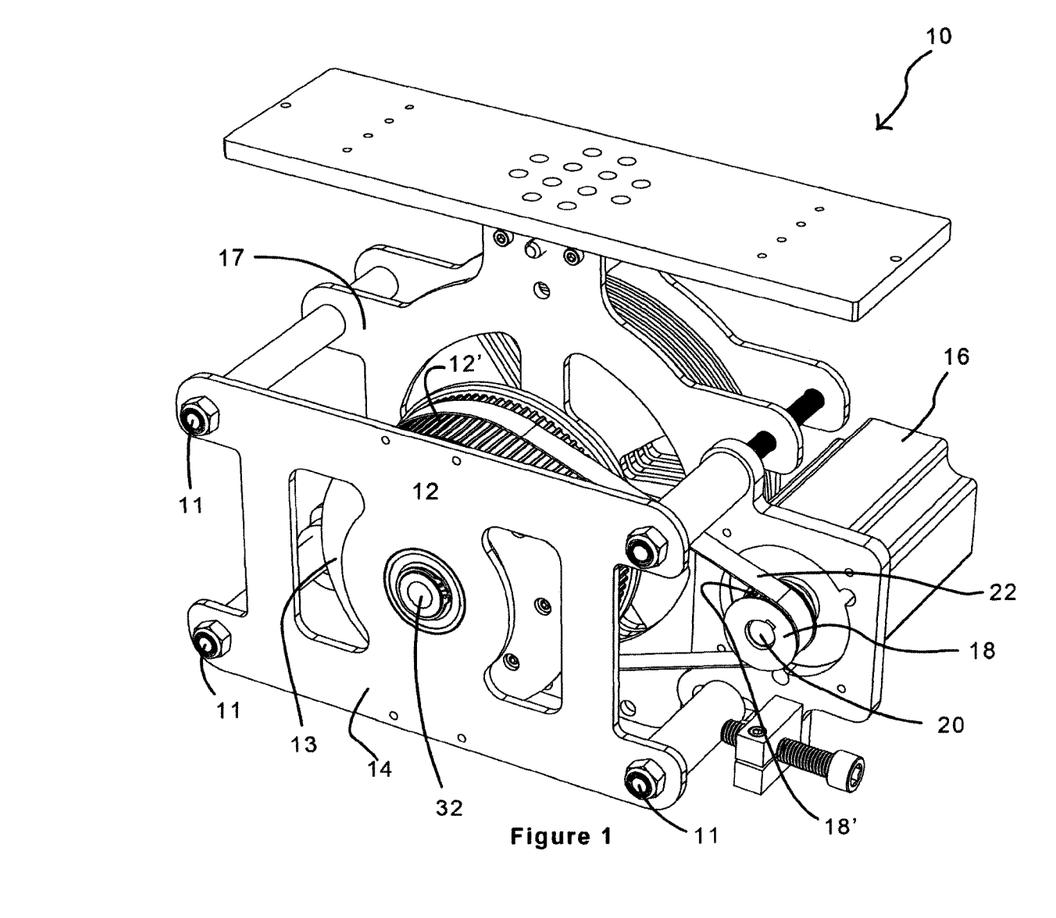
FIG. 1 is a perspective view of an embodiment of the present invention.
Figure 2:
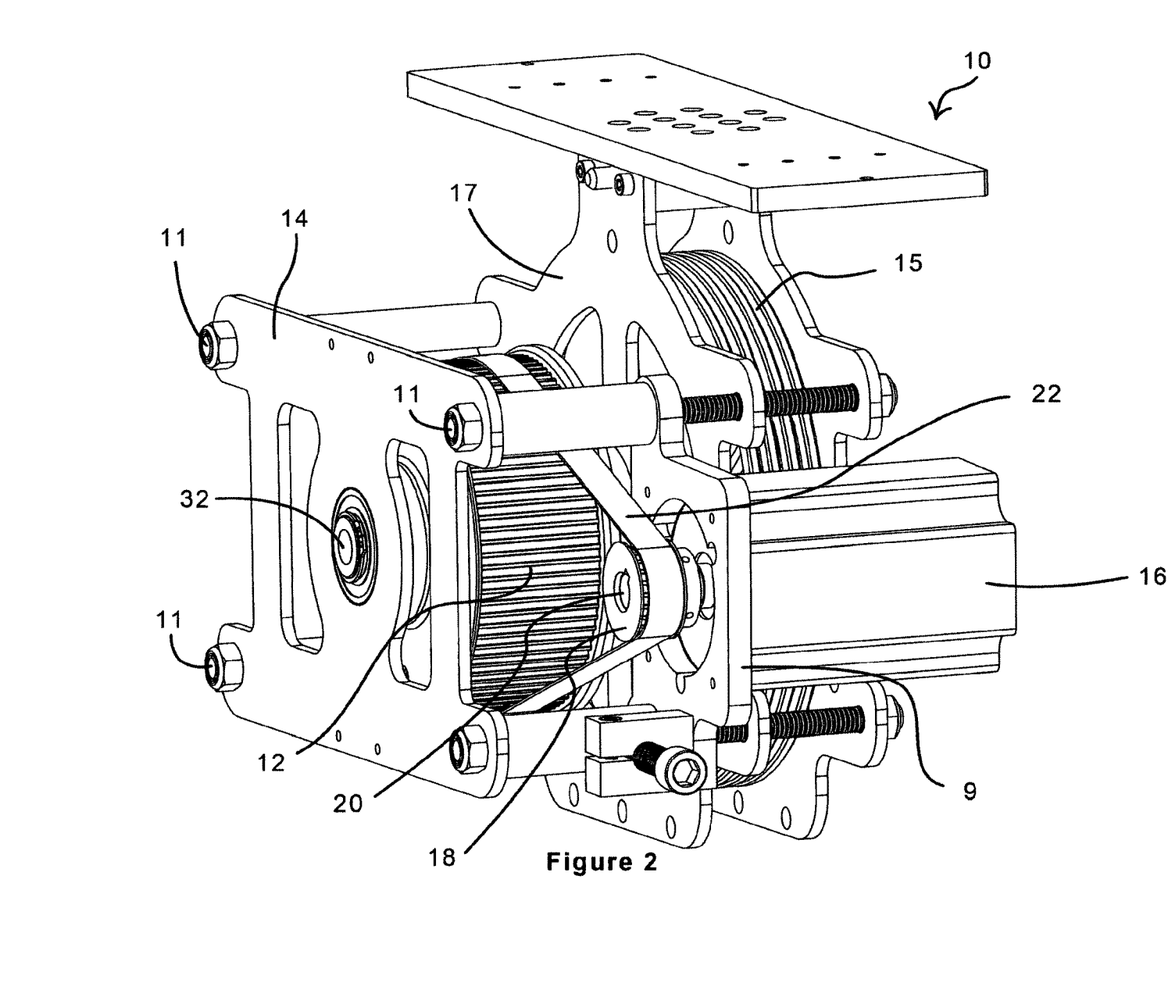
FIG. 2 is a side, perspective of the present invention.
Figure 3:
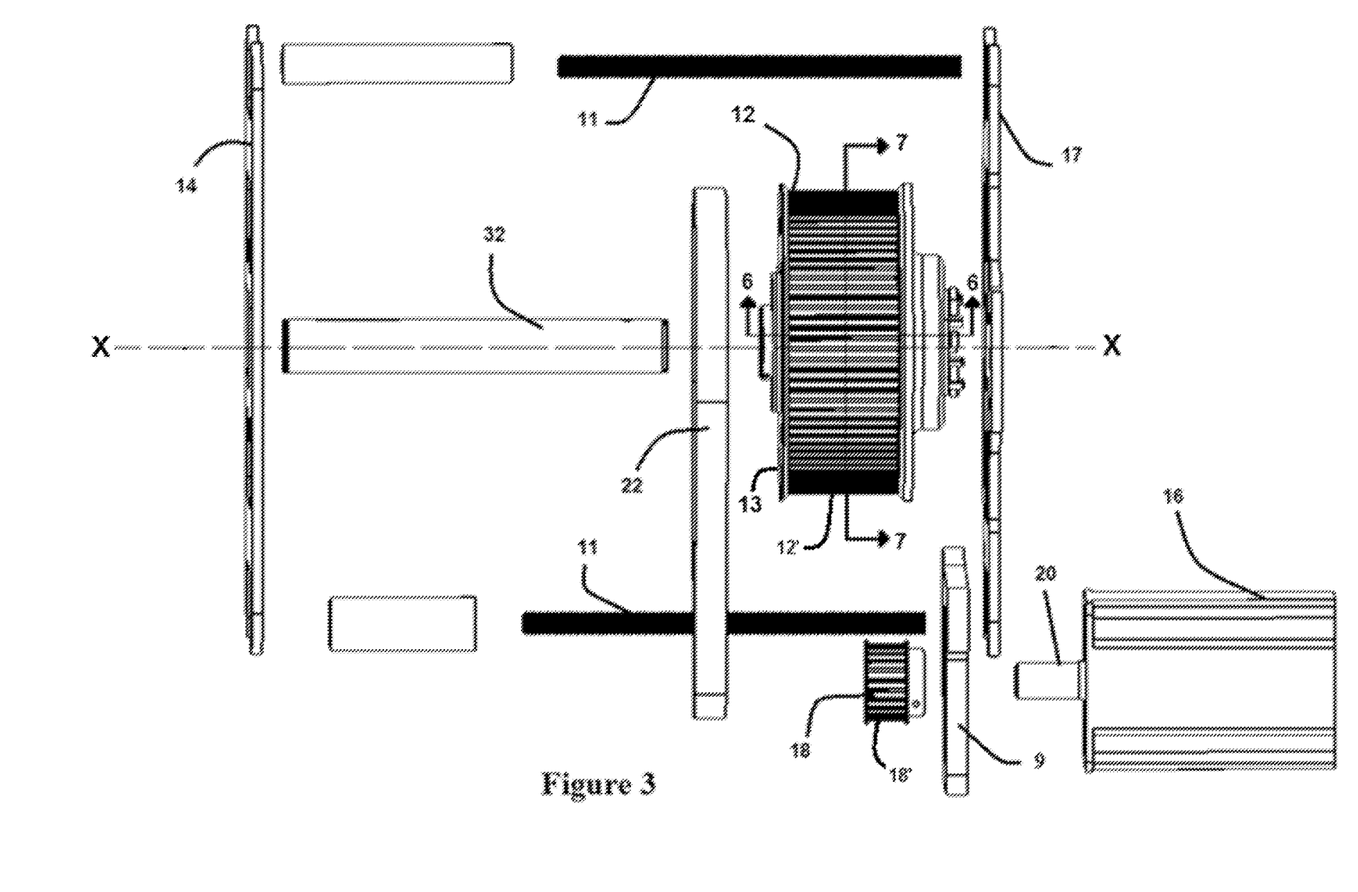
FIG. 3 is an exploded, top, plan view of certain features of the present invention.
Figure 4:
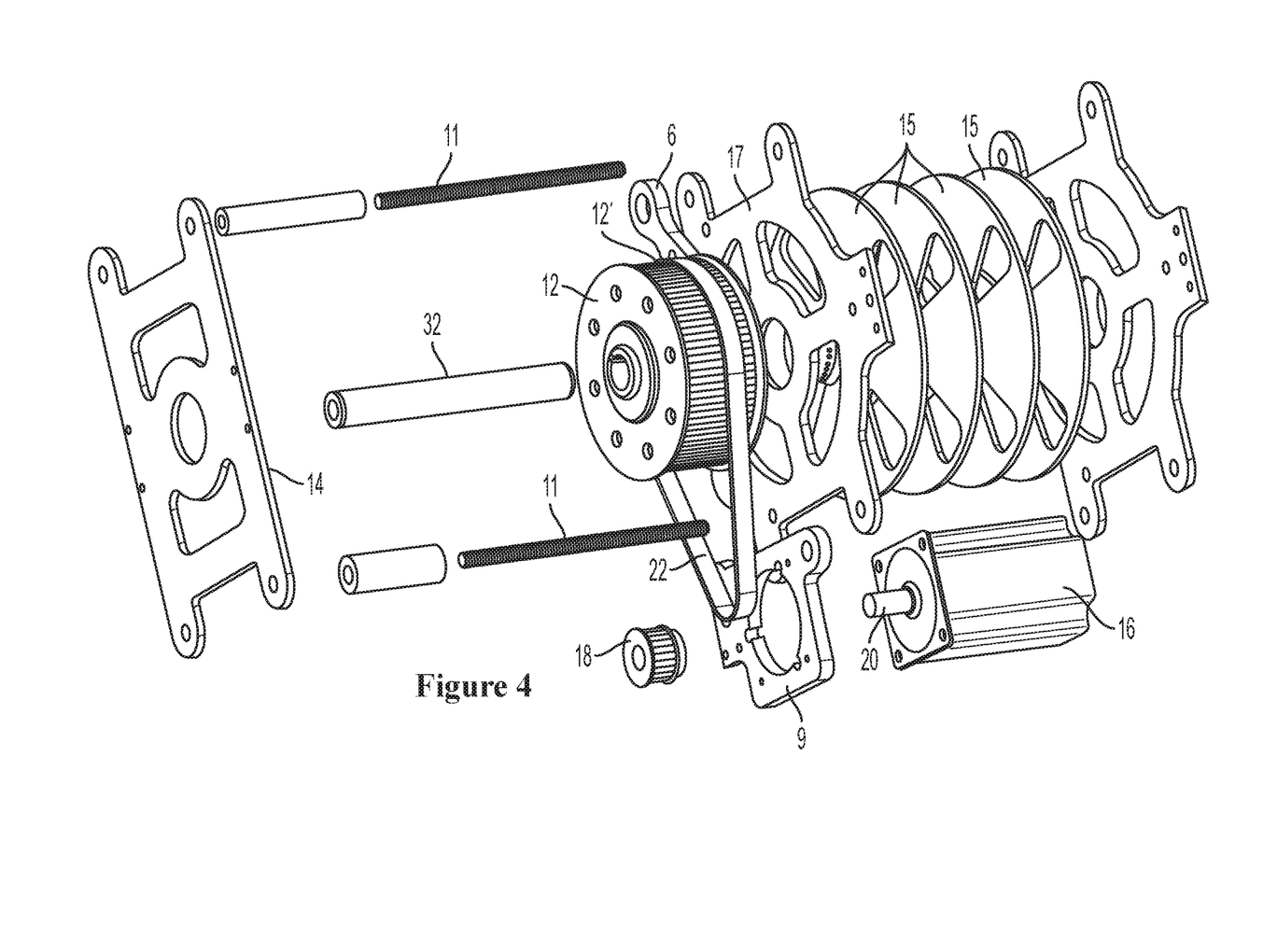
FIG. 4 is an exploded, top, perspective view of the present invention.
Figure 5:
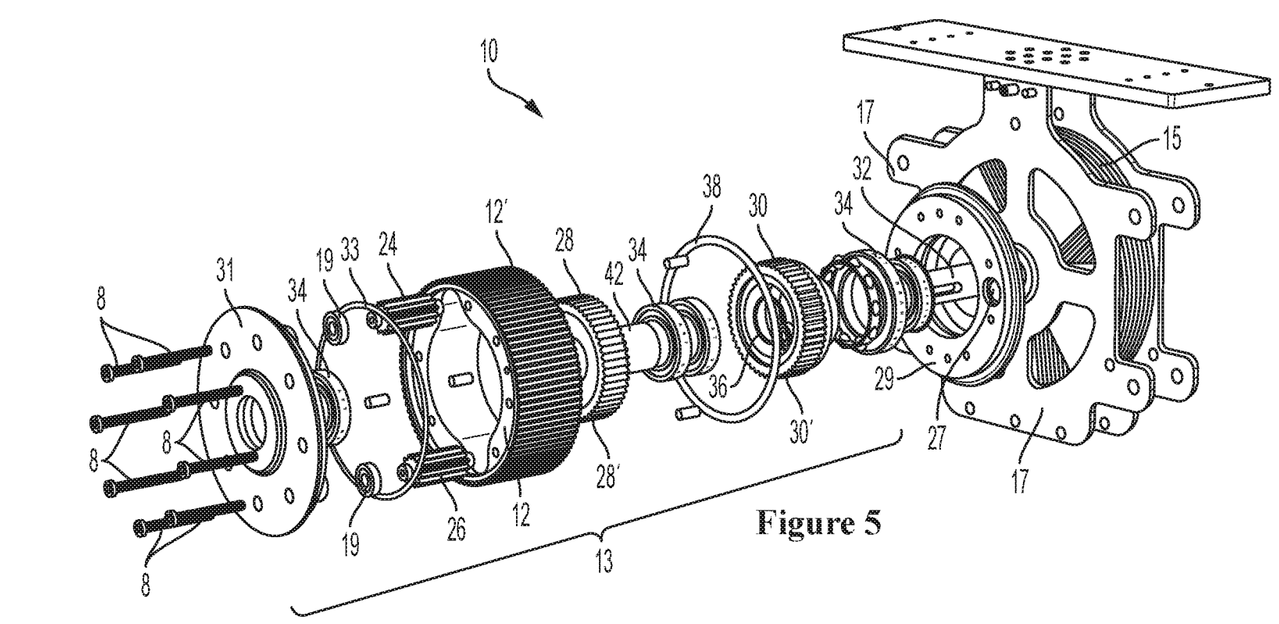
FIG. 5 is an exploded, perspective view of the present invention.
Figure 7:
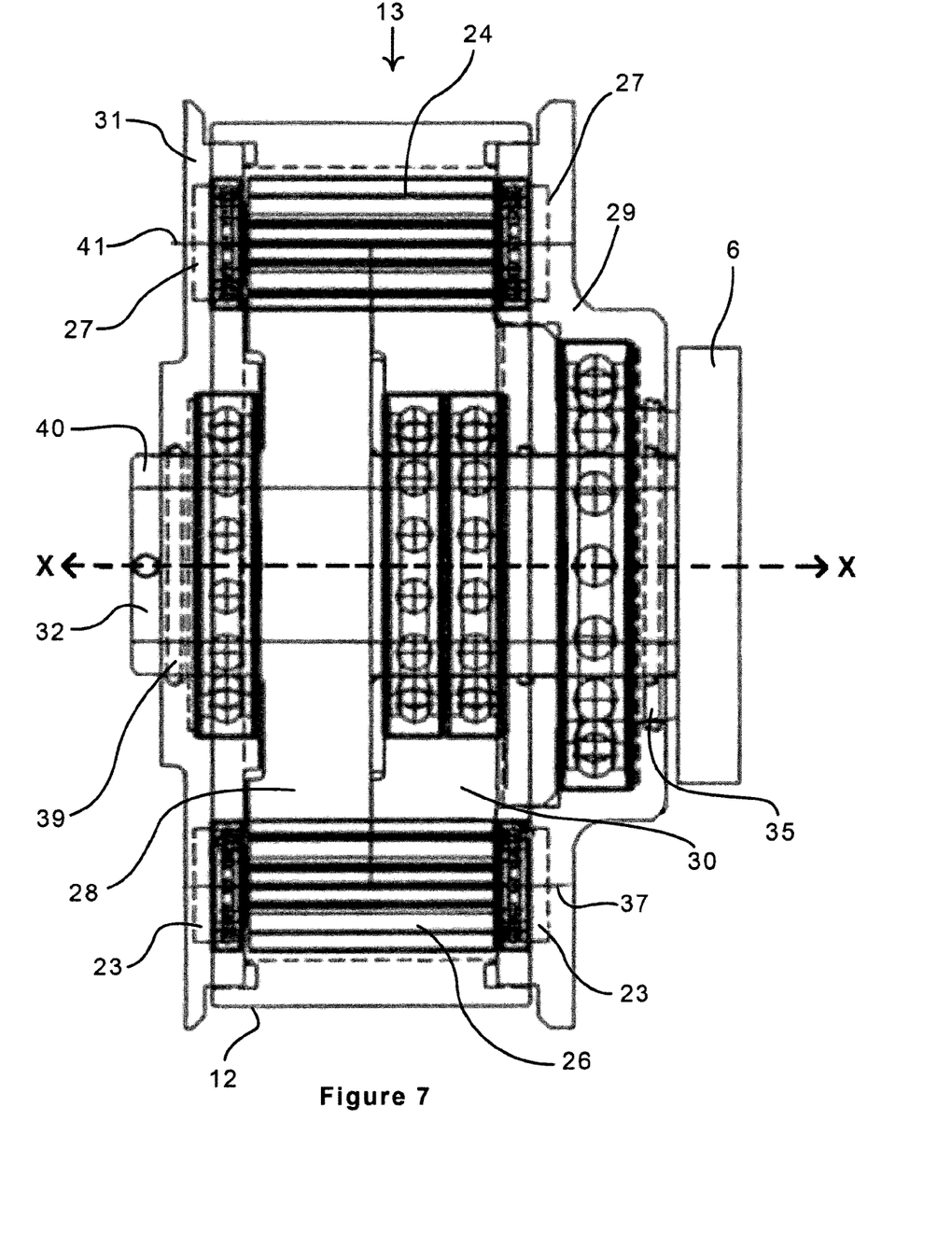
FIG. 7 is a cross-sectional, top, plan view of the gearbox of the present invention, taken across line 7-7 of FIG. 3.

Referring now to FIGS. 5 through 7, the input ring gear 12 in conjunction with ring plates 29, 31 define the housing of gearbox 13. To effectively encapsulate the internal components of gearbox 13, ring plates 29, 31 are joined to input ring gear 12 via a series of bolts 8. A seal is created between ring gear 12 and ring plate 29 by the O-ring seal 36 and dynamic O-ring seal 35. On the opposite side, another seal is created between ring gear 12 and ring plate 31 by a second O-ring seal 33 and dynamic O-ring seal 39. It should be appreciated that the seals of input ring gear 12 may also be embodied as a shaft seal and dynamic shaft seal.

During construction of the gearbox 13, a volume of lubricant is placed in and around the gearbox's internal components. As such, when gearbox 13 rotates, lubricant is flung around (e.g. outward from output shaft 42 and the ball bearing rings 34) so as to self-lubricate the self-contained internal components of gearbox 13 and allow the internal components to remain continuously deposited with lubrication. This allows for a continuous operation of gear system 10, for example, without the need for certain routine, burdensome maintenance.

Within the central opening of input ring gear 12 are planet locking gears 24, 26, output spur gear 28, and fixed spur gear 30. Output spur gear 28 is rotatably mounted on drive shaft 32, in a radially inward, concentric relation to ring gear 12, and is in meshing engagement with planet locking gears 24, 26. Output spur gear 28 further includes output shaft 42, which is hollow to allow the output spur gear 28 to be mounted around drive shaft 32. Fixed spur gear 30 is fixedly mounted over output shaft 42 via mount paddle 6, adjacent to output spur gear 28 on the side thereof opposite ring plate 31. Fixed spur gear 30 is also in meshing engagement with planet locking gears 24, 26. One or more ball bearing rings 34 may be positioned on output shaft 42, in between output shaft 42 and fixed spur gear 30, to facilitate rotation of output spur gear 28 relative to fixed spur gear 30. An additional ball bearing ring 34 may be positioned on fixed spur gear 30 to facilitate rotation of gearbox 13 with respect thereto. In other gear system 10 embodiments, input ring gear 12 may extend in a perpendicular, spaced relation to drive shaft 32 (e.g. via miter gears).

The first and second planet locking gears 24, 26 are rotatably mounted within ring gear 12. Planet gears 24, 26 rotate about their own respective mounting axes 37, 41. Mounting axes 37, 41 are created by orifices 23, 27 in ring plates 29, 31, when the ring plates 29, 31 are mounted to ring gear 12. Second planet gear 26 is in 180° off-set relation with respect to first planet gear 24, about the full 360° circumference of ring gear 12. The planet gears teeth 24', 26' mesh with the spur gear teeth 28', 30' (shown in FIG. 8) causing planet gears 24, 26 to rotate about their respective mounting axes 37, 41 while being revolved around the 360° circumference of spur gears 28, 30 by ring gear 12. One or more planet gear ball bearing rings 19 may be positioned on planet gears 24, 26 to facilitate rotation of planet gears 24, 26 about mounting axes 37, 41.

Figure 8:
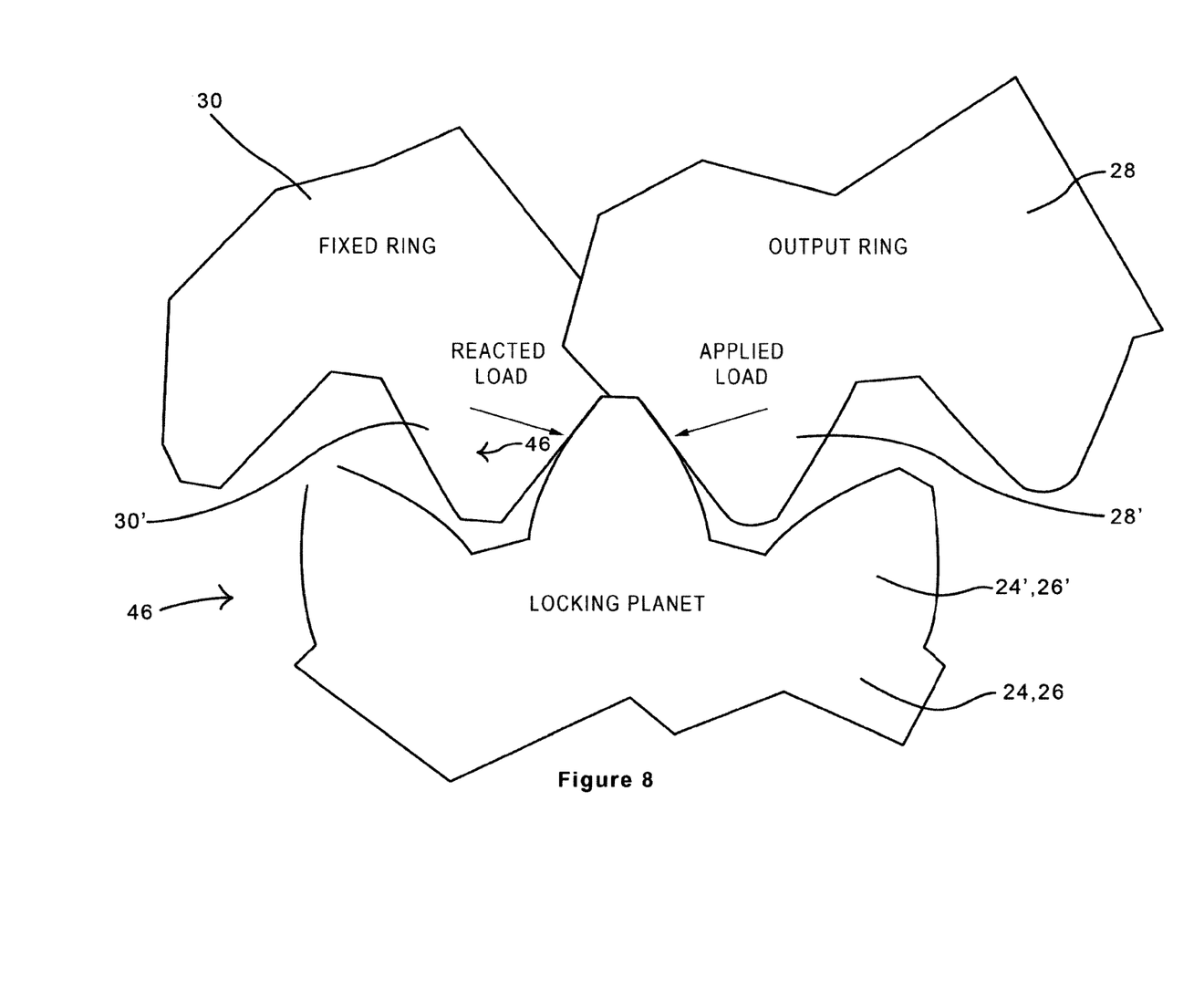
FIG. 8 is an enlarged, schematic, fragmented, plan view showing an embodiment of a gear teeth engagement of the present invention.

Fixed spur gear 30 has N number of gear teeth 30', shown as an involute form geometry. Output spur gear 28 has a substantially similar pitch diameter as the fixed spur gear 30 but with N+/−X number of gear teeth 28' (e.g., two fewer teeth than the fixed spur gear 30), shown as a modified involute form geometry. In the simplest embodiment, the tooth orientation 28' is involute with the spacing between teeth adjusted to take up the space from the removal of the 2 teeth. For example, the difference in tooth spacing for 53/51 teeth and approximately 8 inch diameter ring gear is approximately 0.008" per tooth.

Orienting the output and fixed spur gear teeth 28', 30' in this manner forces gear teeth 28', 30' to substantially align at the point in which they meshingly engage with planet gear teeth 24', 26'. However, beyond this point, gear teeth 28', 30' begin to separate until becoming fully separated at the point about the full 360° circumference of the spur gears 28, 30 furthest from where meshing engagement occurs. For example, when gearbox 13 comprises two planet gears 24, 26, the point of furthest gear teeth 28', 30' separation occurs at the two locations about the full 360° circumference directly between both points where meshing engagement takes place.

Since output spur gear 28 has 2 fewer teeth and fixed spur gear 30 remains stationary, each revolution of the planet gears 24, 26 about the 360° circumference of fixed spur gear 30 yields a rotational advancement of output spur gear 28 by 2 teeth. As follows, rotation of shaft 20 causes rotation of ring gear 12 which causes rotation of planet gears 24, 26 which therefore cause rotation of output spur gear 28 which ultimately causes rotation of drive shaft 32. It is appreciated that the tooth numbers and ratios listed above are an example and are therefore not to be construed as limiting the invention. It will be further appreciated that the gearing concept may be scaled up or down in size of gears, number of gear teeth, number of gears, and/or gear configuration.

FIG. 8 is a schematic diagram illustrating the basic relationship between the output and fixed spur gears 28, 30, respectively, with respect to planet locking gears 24, 26. When rotational force is applied directly to output spur gear 28 via output shaft 42, the gear will create an "Applied Load" force to rotate planet gears 24, 26 on fixed spur gear 30. However, since fixed spur gear 30 is fixed, it will create an equal, countervailing "Reacted Load" force against such a rotation. With "Applied Load" and "Reacted Load" forces being applied on both sides, planet gear teeth 24', 26' become frictionally wedged in between the fixed and output spur gear teeth 28', 30', causing planet gears 24, 26 to lock in place. Once locked, planet gear teeth 24', 26' will halt the rotational advancement of output spur gear 28. Additionally, when the general configuration comprises 2 planet gears 180 degrees apart, any gear twisting (due to shear action between gear teeth) will be in equal and opposite directions on each planet gear and become neutralized. Back rotation of gear box 13 is therefore only made possible through a force of backward rotation made directly to ring gear 12. If a cable connecting a load to the winch 15 happens to break, for example, gear box 13 will not be able to back drive and allow any portion of the cable to retreat back into winch 15.

Planetary drive configurations can also be noisy due to sliding and scuffing between the teeth of the output and fixed spur gears 28', 30' and those of the planet gears 24', 26'. Undue friction is created when output spur gear teeth wedge the planet gear teeth, discussed above. To reduce such sliding, scuffing, and undue friction, the output and fixed spur gear teeth 28', 30' and planet gear teeth 24', 26' are configured to comprise an angularly complimenting, noise-dampening pressure angle 46 (also known as the "angle of obliquity").

While the pressure angles of most common stock gears are around 14½°, 20°, or 22°, the output and fixed gear pressure angles are most preferably made to be approximately 35°. This pressure angle configuration provides for lower backlash, smoother operation, and less sensitivity to manufacturing flaws. More specifically, the larger angles allow for the fixed and output spur gear teeth 28', 30' to slide easily in between the planet gear teeth 24',26' with more rolling and less scuffing than previous pressure angles. This may also generally be accomplished by larger pressure angles that range from approximately 25° to 45°.

It should be appreciated that the gears, shafts, and housings of the output ring gear system 10 may be made from, but are limited to, metals, plastics, composites, ceramics, woods, plywood, castings, metal powders, metal or plastic extrusions, or punched blanks. The various components of the output ring gear system 10 may be manufactured by, for example, laser cutting processes, water jet cutting processes, punch and die, fine-blanking, roll forming, investment cast, or laminated layers of materials (e.g. sheet metal, plastic, paper), or 3D printing processes.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A self-locking non-backdrivable gear system, comprising:
   a. a self-lubricating gearbox, a primary motor input and a drive shaft, said primary motor input adapted to cause rotation of said self-lubricating gearbox about the axis of said drive shaft;
   b. said self-lubricating gearbox comprising:
      i. an input ring gear mounted around said drive shaft and positioned in rotational engagement with said primary motor input;
      ii. a ring plate and seal configuration mounted to said ring gear for sealing components within said ring gear to allow the internal self-lubrication of said gearbox through a volume of lubricant;
      iii. a planet locking gear rotatably mounted within said ring gear, whereby said planet gear rotates with said ring gear and also rotates about its own mounting axis;
      iv. an output spur gear rotatably mounted within said ring gear in a radially inward, concentric relation to said ring gear and further includes an output shaft adapted for mounting to said drive shaft, said output spur gear has a first predetermined number of gear teeth in meshing engagement with said planet gear;
      v. a fixed spur gear fixedly mounted around said output shaft and positioned adjacent to said output spur gear, said fixed spur gear has a second predetermined number of gear teeth in meshing engagement with said planet gear wherein said first predetermined number and said second predetermined number are different; and
      vi. wherein said fixed and output spur gears have substantially similar diameters to allow said fixed and output spur gear teeth to substantially align while engaging with said planet gear, vii. wherein said fixed and output spur gear teeth comprise a noise-dampening pressure angle configuration which angularly compliment said planet gear teeth, viii. whereby rotation of said primary motor input causes rotation of said ring gear which causes rotation of said planet gear which causes rotation of said output spur gear which causes rotation of said drive shaft, and whereby in the absence of rotation of said ring gear a rotational force applied to said output spur gear forces the substantially aligned said fixed and output gear teeth to lock said planet locking gear in place.

2. The gear system of claim 1 further comprising a second planet locking gear rotatably mounted within said ring gear in 180° off-set relation with respect to the first planet locking gear, about the full 360° circumference of the ring gear, whereby said first and second planet gears rotate with said ring gear and also rotate about their own respective mounting axes while engaging said fixed and output spur gear teeth, and whereby in the absence of rotation of the ring gear a rotational force applied to said output spur gear will force said fixed and output spur gear teeth to lock said first and second planet gears in place.

3. The gear system of claim 1 wherein said primary motor input comprises a sprocket in meshing engagement with a timing belt.

4. The gear system of claim 1 wherein said primary motor input comprises a sprocket in meshing engagement with a timing chain.

5. The gear system of claim 1 wherein each said seal of said ring plate and seal configuration is an O-ring or shaft seal.

6. The gear system of claim 1 wherein said gearbox further comprises a ball bearing ring positioned on said output spur gear to facilitate rotation of said output spur gear.

7. The gear system of claim 1 wherein said pressure angle configuration is 35 degrees.

8. The gear system of claim 1 wherein said pressure angle configuration is between 30 degrees to 40 degrees.

9. The gear system of claim 1 wherein said pressure angle configuration is between 25 degrees to 45 degrees.

10. The gear system of claim 1 wherein said components of said gearbox are made from metal, plastic, composite, ceramic, wood, plywood, metal powder, or combinations thereof.

11. The gear system of claim 1 wherein said input ring pear extends in a parallel, spaced relation to said drive shaft.

* * * * *